United States Patent [19]

Johannesen

[11] Patent Number: 5,067,596
[45] Date of Patent: Nov. 26, 1991

[54] CLIP-ON AUTOMATIC ADJUSTER STRUT LEVER FOR A DRUM BRAKE

[75] Inventor: Donald D. Johannesen, South Bend, Ind.

[73] Assignee: Allied Signal Inc., Morristown, N.J.

[21] Appl. No.: 594,584

[22] Filed: Oct. 9, 1990

[51] Int. Cl.$^5$ .................. F16D 51/00; F16D 65/38
[52] U.S. Cl. .................. 188/79.54; 188/196 BA
[58] Field of Search ............ 188/79.51, 79.53, 196 R, 188/196 B, 196 BA, 79.62, 79.63, 79.54, 79.54; 192/111 A

[56] References Cited

U.S. PATENT DOCUMENTS

| | | | |
|---|---|---|---|
| 3,605,957 | 9/1971 | Mossey | 188/196 BA X |
| 4,148,380 | 4/1979 | Haraikawa | 192/111 A X |
| 4,375,252 | 3/1983 | Aono et al. | 192/111 A X |
| 4,503,949 | 3/1985 | Carré et al. | 188/196 BA X |
| 4,646,881 | 3/1987 | Denree et al. | 188/196 BA X |
| 4,729,457 | 3/1988 | Cousin et al. | 188/196 BA X |

*Primary Examiner*—Robert J. Oberleitner
*Assistant Examiner*—Josie A. Ballato
*Attorney, Agent, or Firm*—Larry J. Palguta; Ken C. Decker

[57] ABSTRACT

An automatically adjustable strut (60) is mounted adjacent a drum brake (10) wheel cylinder (20) and strut forks (62, 66) bear against a pair of brake shoes (12, 14) and a parking brake lever (50). The strut (60) extends automatically according to wear of the brake shoes (12, 14) and comprises a nut-and-bolt system operated by a pawl (75) engaging teeth (84) of a nut (80). The pawl (75) is part of a clip-on automatic adjuster strut lever (100) mounted resiliently upon a body (68) of the strut (60). The strut lever (100) includes a loading arm (108) which resiliently engages the body (68) of the strut (60), so that proper operational loading is effected by the pawl (75) upon the nut (80). The strut lever (100) also includes a spring lever arm (120) which engages a rocker lever (90) that moves the lever arm (120) and pawl (75) when the brake (10) is released toward an at-rest position, and then permits movement of the pawl (75) in an opposite direction when the brake (10) is applied. The strut lever (100) is mounted slidably onto the body (68) of the strut (60) by way of a base member (104) having an opening (106) whose circumference has a portion (113) received within a groove (65) in the body (68) of the strut (60).

11 Claims, 2 Drawing Sheets

CLIP-ON AUTOMATIC ADJUSTER STRUT LEVER FOR A DRUM BRAKE

The present invention relates generally to automatic adjustment devices intended to compensate automatically for the wear of friction linings of brake shoes in a drum brake, and more particularly to a resilient strut lever which is slidably and slightly resiliently mounted upon the body of an extendible strut.

Prior automatic adjustment devices for drum brakes have been provided in many forms. Typically, an automatic adjustment device which includes a pawl that engages a nut of a nut-and-bolt system must overcome two potential problems in order to rotate the nut appropriately. First, the pawl must exert a light radial load relative to the nut so that when the pawl is moved in one direction before returning in an opposite direction to engage a ramp of a tooth and cause the nut to rotate, the pawl will not cause the nut to rotate in an undesired direction of rotation during the first movement. The result of too high a radial load by the pawl on the nut is what has been called "rock back" wherein the nut fluctuates rotationally during the two opposite direction movements of the pawl so that the nut is not advanced properly along the bolt. It is desirable in such a nut-and-bolt adjustment system for the nut to be rotated only in one direction and that should occur when the pawl moves against a ramp of a tooth. U. S. Pat. No. 4,729,457 illustrates an elastic leaf 13 having a pawl 12 that is manufactured as an extra part and then attached to the elastic leaf 13 in order to provide a low radial load against the teeth of the nut and avoid the rock-back problem. Another way of avoiding the rock back problem caused by too large of a radial load exerted by the pawl against the nut, is illustrated in U. S. Pat. No. 4,646,881 wherein the elastic leaf 13 includes a rachet 12 that is very thin relative to the size of the body of the elastic leaf in order to deflect appropriately and avoid the rock-back problem. In both of the above-mentioned patents, the elastic leafs 13 are attached by means of rivets to the body of the adjustable strut. Also, each of the patents illustrates springs 10 and 26 attached to opposite ends of the strut and the respective brake shoe in order to cause the opposite ends of the strut to move outwardly with the respective brake shoe when the brake shoes are applied by the wheel cylinder of the drum brake. It is advantageous to eliminate these springs.

Solutions to the above problems are provided by an automatically adjustable strut for a drum brake, the strut to be mounted adjacent brake application means disposed between two first ends of two brake shoes, each end of the strut to bear against a respective brake shoe, the strut having a device which automatically extends the length of the strut according to wear of the brake shoes and comprising a nut-and-bolt system operated by a strut lever mounted resiliently upon a body of the strut and having a pawl engaging teeth of the nut-and-bolt system, the pawl connected with an elastic leaf of the strut lever and being moved, by means of a rocker lever mounted on the strut, in one direction relative to the strut when the brake returns toward an at-rest position, the rocker lever moving to permit the pawl to move in an opposite direction relative to the strut when the brake is applied, the strut lever further comprising a base member disposed at an angle to the elastic leaf and having therein an opening receiving said body of the strut, the body of the strut including means for engaging a portion of the base member, a loading arm extending from said base member and engaging resiliently said body in order to provide a predetermined load upon said elastic leaf and pawl, and a spring lever arm extending at an angle from said elastic leaf and engaging said rocker lever, and means for positioning the strut lever circumferentially relative to the strut and disposed between the body and base member.

The invention will now be described by way of example with reference to the accompanying drawings in which.

Figure 1:
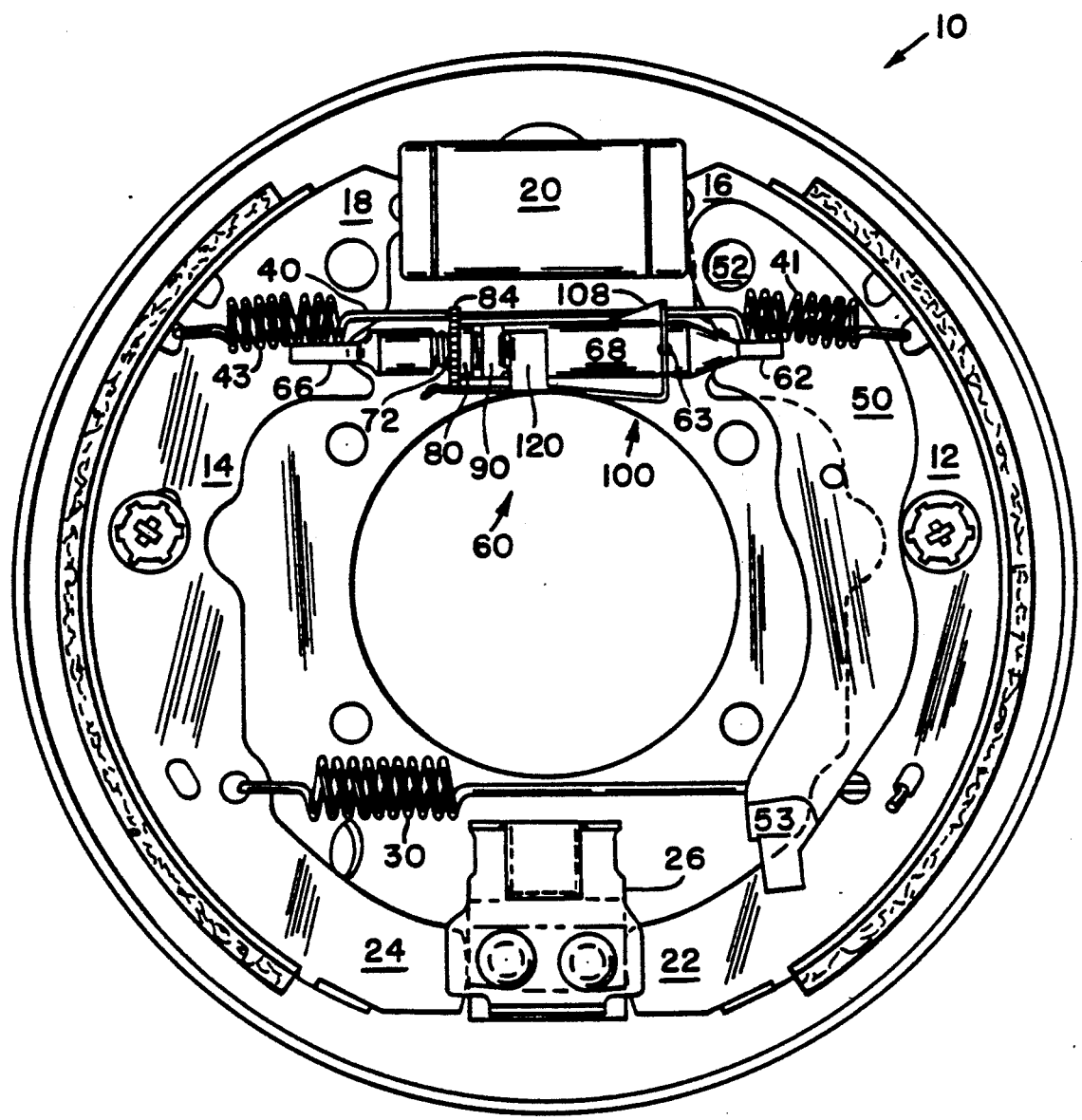
FIG. 1 is a view of a drum brake including the automatic adjuster strut of the present invention.
Figure 2:
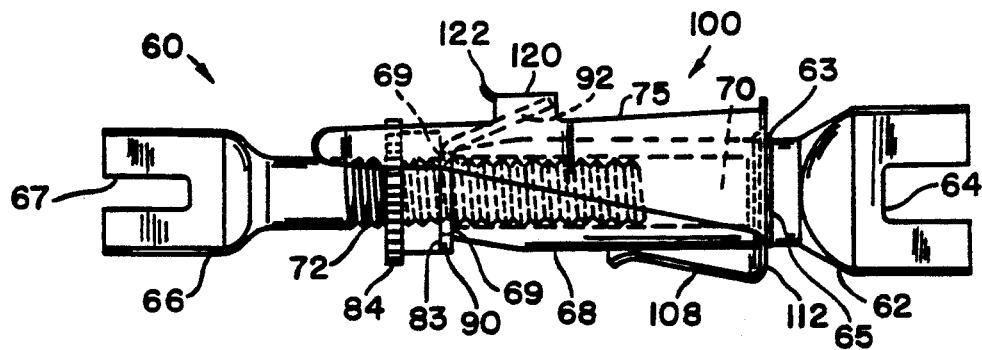
FIG. 2 is a view of just the automatic adjuster strut rotated relative to its position in FIG. 1 in order to illustrate some of its features.

FIG. 1 illustrates a view of a nonservo drum brake containing the automatically adjustable strut in accordance with the Present invention. Drum brake 10 includes a pair of brake shoes 12, 14 which engage at first ends 16, 18 a wheel cylinder 20. Second ends 22, 24 engage anchor 26 and are biased together by return spring 30. First brake shoe ends 16, 18 are biased toward one another by spring or resilient means 40. Springs 30 and 40 are each attached to brake shoes 12, 14. Parking brake lever 50 is attached by means of pivot pin 52 to the web of brake shoe 12 and at an opposite end 53 is attached to a not shown parking brake cable. Located between shoes 12, 14 and parking brake lever 50 is automatic adjuster strut 60 in accordance with the present invention. Strut 60, which is shown in more detail in FIG. 2 and rotated in order to illustrate some of its features, comprises strut fork 62 having enlarged opening 64 which receives both the web of brake shoe 12 and parking brake lever 50. Opposite from strut fork 62 is strut fork 66 having opening 67 which receives the web of brake shoe 14. Strut fork 62 includes strut body 68 that has interior opening 70. Strut fork 66 includes threads 72 which are freely received within opening 70. Located on threads 72 is nut 80 which contains internal threads that mesh with threads 72 of strut fork 66. Nut 80 contains about the circumference thereof a plurality of ramped teeth 84. Nut 80 rotates about threads 72 so that it moves laterally along strut fork 66.

Figure 4:
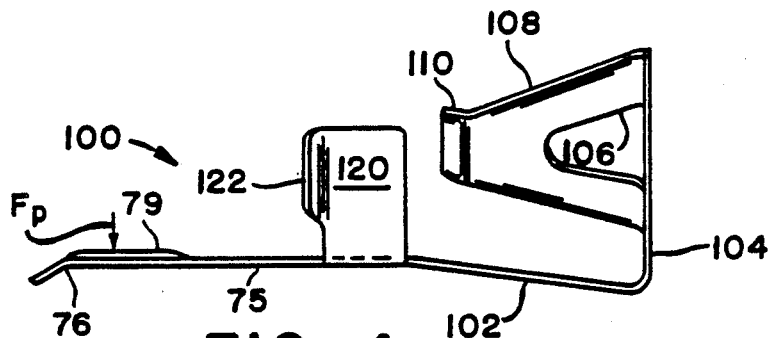
FIG. 4 is a top view of the adjuster strut lever from the left side and of FIG. 3.
Figure 5:
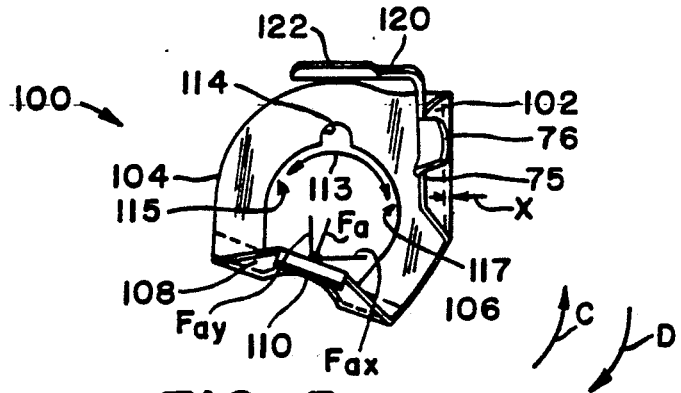
FIG. 5 is a view of the adjuster strut lever from the left side end of FIG. 4.

Located about threads 72 of strut fork 66 is rocker lever 90 which includes a central opening 69 receiving threads 72, and lever extension 92 which engages a spring lever arm 120 of leaf spring or clip-on automatic adjuster strut lever 100. Strut lever 100 is mounted on strut fork 62 and illustrated in detail in FIGS. 3-5. Lever 100 comprises pawl 75 that includes an elastic leaf 102, and a base member 104 that is disposed at less than a 90° angle relative to elastic leaf 102. Base 104 includes opening 106 which receives strut body 68 of strut fork 62. Opening 106 of base 104 extends around curved end 112 in order to simplify manufacturing of opening 106. Extending from base member 104 is loading arm 108 with flanged end 110 which engages resiliently strut body 68. When strut lever 100 is mounted on body 68 of strut fork 62, loading arm 108 biases leaf spring or lever 100 into an operational position so that appropriate operating loads are imposed upon nut 80. Loading arm 108 is located at an angle relative to the pawl 75 (see FIG. 5) such that the reaction force $F_a$ exerted on loading arm 108 by body 68 effects proportional reaction forces comprising $F_{ax}$ and $F_{ay}$ which correspond, respectively, in magnitude to reaction forces $F_p$ and $F_{sla}$ (see FIGS. 3 and 4) which act upon the pawl 75 and spring lever arm 120, respectively. As illustrated in FIG. 5, the circumference of opening 106 includes recess 114 which receives protrusion 63 (see FIG. 2) of body 68 in order to position leaf spring or lever 100 circumferentially relative to body 68. Body 68 includes engaging means or groove 65 (FIG. 2) which permits base member 104 to seat resiliently a portion of the circumference of opening 106 within the groove. Base member 104 of lever 100 engages slightly resiliently strut fork 62 such that a circumferential portion or arc 113 of opening 106 disposed approximately between base portions 115 and 117 engages groove 65 to position lever 100 upon body 68. Opening 106 is larger than the exterior radius of body 68, and therefore only the part of the circumference of opening 106 illustrated by arc 113 engages portions of groove 65.

Elastic leaf 102 extends to spring lever arm 120 that has angled end 122. Spring lever arm 120 engages lever extension 92 of lever 90 so that extension 92 is biased continuously radially inwardly toward body 68. Pawl 75 also includes angled end 76, and continuously engages teeth 84 of nut 80. Edge 79 of pawl 75 is provided for engagement with a ramped tooth 84 when pawl 75 moves in the direction of arrow A illustrated in FIG. 3.

The method of operation of automatically adjustable strut 60 within drum brake 10 will now be described. When at rest (as shown in FIG. 1), return spring 40 biases shoe ends 16 and 18 toward one another and away from the drum (not shown). Rocker lever 90 is captured between flat surface 83 of nut 80 and flat surface 69 of body 68. The closer surfaces 69, 80 are to one another, the further extension 92 is moved away from body 68 which causes spring lever arm 120 to move away from body 68 against the opposite biasing force of loading arm 108, and pawl 75 is positioned in the direction of arrow B in FIG. 3. When the vehicle operator applies the brakes, wheel cylinder 20 moves brake shoe ends 16, 18 away from one another so that that the brake shoes engage the rotating drum. As shoes 16 and 18 move outwardly away from one another, strut forks 62 and 66 move with the respective shoes and away from one another. Note in FIG. 1 that spring coils 41 and 43 are positioned so that they biasingly engage the ends of strut forks 62 and 66, respectively. This engagement biases the strut forks into engagement with the respective brake shoe webs and the parking brake lever so that as shoe 14 and shoe 12/parking brake lever 50 move away from one another, the strut forks 62 and 66 move with the respective shoes. As strut fork 66 moves away from strut fork 62, nut surface 83 is moved away from body surface 69 so that rocker lever 92 may tilt and extension 92 move toward body 68. This allows spring lever arm 120 (through the biasing force of loading arm 108 engaging body 68) to move with lever extension 92 so that pawl 75 moves in the direction of arrow A in FIG. 3. As pawl 75 moves, edge 79 engages a ramp of a tooth 84 and causes nut 80 to rotate about threads 72 of strut fork 66. As nut 80 rotates, it advances toward strut fork 62 so that the length of strut 60 will be increased according to the wear of the brake shoes. When the vehicle operator releases the brakes, return spring 40 brings shoe ends 16, 18 back toward the at-rest position illustrated in FIG. 1. This also causes, via the brake shoe webs and parking brake lever, strut forks 62 and 66 to approach one another so that nut surface 83 approaches body surface 69 and rocker lever 90 is tilted such that extension 92 moves spring lever arm 120 away from body 68 and pawl 75 (sliding over teeth 84) moves in the direction of arrow B in FIG. 3. This leaves pawl 75 positioned, according to brake lining wear, for a subsequent movement in the direction of arrow A (FIG. 3) when the brake is once again applied.

The automatically adjustable strut of the present invention provides solutions to the above described problems according to the following aspects of its structure. First, the "rock-back" problem is eliminated by providing the bending of the pawl and elastic leaf only across the thickness X illustrated in FIG. 5 so that a 80. As a result, when pawl 75 moves in the direction of arrow B in FIG. 3, pawl 75 does not cause teeth 84 to counterrotate in the direction of arrow C (see FIG. 5). Thus, when pawl 75 moves in the direction of arrow A in FIG. 3, nut 80 is rotated in the direction of arrow D in FIG. 5 so that the strut's length is extended. The light side or radial load of pawl 75 against teeth 84 of nut 80 prevents the nut from counterrotating during the release phase of braking and then effects rotation in the desired direction during the application phase of braking.

Figure 3:
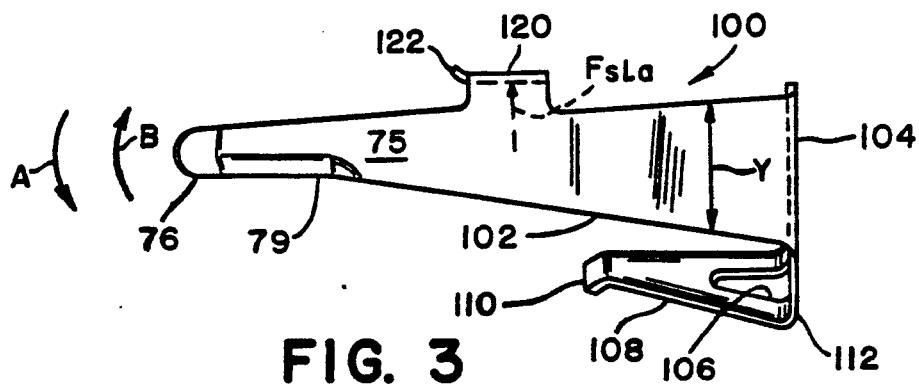
FIG. 3 is a view of the clip-on adjuster strut lever of the automatic adjuster strut.

A very strong or high tangential load is desired by strut lever 100 in order to rotate nut 80 in the desired direction of rotation. This is accomplished by utilizing the entire thickness Y (see FIG. 3) of strut lever 100 as a resistance to bending by pawl 75 when the pawl edge 79 engages a ramp of a tooth 84 during movement in the direction of arrow A (FIG. 3).

Strut lever 100 does not require rivets or any means of fixedly attaching the spring to body 68. Lever 100 is mounted with slight resilience upon body 68 such that the circumference of opening 106 has the above described circumferential portion 113 seated in the groove, and recess 114 receives protrusion 63 to effect circumferential positioning. Loading arm 108 biases lever 100 such that spring lever arm 120 engages lever extension 92 and pawl 75 engages teeth 84.

As described above, adjustable strut 60 does not require the presence of springs attached to forks 62 and 66 in order for the forks to travel with the brake shoe ends 16, 18 as the brake is applied. Coils 41, 43 of return spring 40 engage biasingly strut forks 62 and 66 so that the forks are biased into engagement with brake shoes 12, 14 and parking brake lever 50, and the strut forks are displaced with the associated brake shoe ends when the brake is applied.

Finally, the adjustable strut of the present invention does comprise either a left- or right-handed strut. In other words, the threads 72 of fork 66 and the threads of nut 80 need not be right- or left-handed according to which side of the vehicle the brake is positioned. Adjustable strut 60 does not have right- or left-handed threads because the strut forks do not become functionally part of the brake shoe ends, and thus strut 60 may be utilized interchangably on brakes at either side of the vehicle.

I claim:

1. An automatically adjustable strut for a drum brake, the strut to be mounted adjacent brake application means disposed between two first ends of two brake shoes, each end of the strut to bear against a respective brake shoe, the strut having a device which automatically extends the length of the strut according to wear of the brake shoes and comprising a nut-and-bolt system operated by a strut lever mounted resiliently upon a body of the strut and having a pawl engaging teeth of the nut-and-bolt system, the pawl connected with an elastic leaf of the strut lever and being moved, by means of a rocker lever mounted on the strut, in one direction relative to the strut when the brake returns toward an at-rest position after brake application, the rocker lever moving to permit the pawl to move in an opposite direction relative to the strut when the brake is applied, the strut lever further comprising a base member disposed at an angle to the elastic leaf and having therein an opening receiving said body of the strut, the body of the strut including means for engaging a portion of the base member, a loading arm extending from said base member and engaging resiliently said body in order to provide a predetermined load upon said elastic leaf and pawl, and a spring lever arm extending at an angle from said elastic leaf and engaging said rocker lever, and means for positioning the strut lever circumferentially relative to the strut and disposed between the body and base member.

2. The strut in accordance with claim 1, wherein the circumferencial positioning means comprises a protrusion disposed on said body and a correspondingly shaped recess located at an edge of said opening which receives said protrusion.

3. The strut in accordance with claim 2, wherein the engaging means comprises a groove and the protrusion is disposed within said groove.

4. The strut in accordance with claim 3, wherein said strut lever slides onto the body of said strut and said portion seats resiliently within said groove.

5. The strut in accordance with claim 1, wherein said strut is disposed between the first ends of the two brake shoes which are biased together by resilient means, the resilient means resiliently engaging opposite ends of the strut to bias the ends of the strut into engagement with the brake shoes and a parking brake lever of the brake so that the ends of the strut move outwardly with the brake shoes and parking brake lever when the brake is applied.

6. A drum brake having an automatically adjustable strut, the strut mounted adjacent brake application means disposed between two first ends of two brake shoes, the strut bearing against the brake shoes and having a device which automatically extends the length of the strut according to wear of the brake shoes, the device comprising a nut-and-bolt system operated by a strut lever mounted resiliently upon a body of the strut and having a pawl engaging teeth of the nut-and-bolt system, the pawl being moved, by means of a rocker lever mounted on the strut, in one direction relative to the strut when the brake returns toward an at-rest position after brake application, the rocker lever permitting the pawl to move in an opposite direction relative to the strut when the brake is applied, the strut lever further comprising a base member disposed at an angle to the pawl and having therein an opening receiving said body of the strut, the body of the strut including means for engaging a portion of said base member, a loading arm extending from said base member and engaging resiliently said body in order to provide a predetermined load upon said pawl, and a spring lever arm extending from said pawl and engaging said rocker lever, and means for positioning the strut lever circumferentially relative to the strut and disposed between the body and base member.

7. The brake in accordance with claim 6, wherein the circumferencial positioning means comprises a protrusion disposed on said body and a correspondingly shaped recess located at an edge of said opening which receives said protrusion.

8. The brake in accordance with claim 7, wherein the engaging means comprises a groove.

9. The brake in accordance with claim 8, wherein the protrusion is disposed within said groove.

10. The brake in accordance with claim 9, wherein said strut lever slides onto the body of said strut and said portion seats resiliently within said groove.

11. The brake in accordance with claim 6, wherein said first ends of the two brake shoes are biased together by resilient means, the resilient means resiliently engaging opposite ends of the strut to bias the ends of the strut into engagement with the brake shoes and a parking brake lever of the brake so that the ends of the strut move outwardly with the brake shoes and parking brake lever when the brake is applied.

* * * * *

UNITED STATES PATENT AND TRADEMARK OFFICE
CERTIFICATE OF CORRECTION

PATENT NO. : 5,067,596
DATED : November 26, 1991
INVENTOR(S) : Donald D. Johannesen It is certified that error appears in the above-identified patent and that said Letters Patent is hereby corrected as shown below:

Column 4, line 17, after "a" insert --light side or radial load is exerted upon teeth 84 of nut--

Signed and Sealed this

Thirty-first Day of August, 1993

Attest:

BRUCE LEHMAN

Attesting Officer

Commissioner of Patents and Trademarks